United States Patent [19]

Ichie

[11] Patent Number: 5,050,187
[45] Date of Patent: Sep. 17, 1991

[54] COMMUNICATION SYSTEM EQUIPPED WITH AN AC COUPLING RECEIVER CIRCUIT

[75] Inventor: Takamichi Ichie, Chigasaki, Japan

[73] Assignee: The Furukawa Electric Co., Ltd., Tokyo, Japan

[21] Appl. No.: 335,541

[22] Filed: Apr. 10, 1989

[30] Foreign Application Priority Data

Apr. 12, 1988 [JP] Japan .................................. 63-90100
Dec. 28, 1988 [JP] Japan ................................ 63-329226
Dec. 28, 1988 [JP] Japan ................................ 63-329227

[51] Int. Cl.⁵ ............................................ H03G 11/04
[52] U.S. Cl. .................................... 375/36; 178/63 C; 307/551; 307/561; 371/57.1
[58] Field of Search ................. 375/36, 76; 455/217, 455/288; 170/63 C; 330/11, 298, 185, 207 P; 307/540, 542, 551, 561, 565; 361/56, 91, 54, 60; 371/57.1, 63; 379/331, 412; 381/55, 72

[56] References Cited

U.S. PATENT DOCUMENTS

| 3,533,003 | 10/1970 | Plaszczynski et al. | 330/207 P |
|---|---|---|---|
| 3,633,093 | 1/1972 | Templeton, Jr. et al. | 330/207 P |
| 3,656,003 | 4/1972 | Chen | 307/551 |
| 3,679,989 | 7/1972 | Thibodeau | 330/207 P |
| 3,825,682 | 7/1974 | Philipps | 178/69 G |
| 3,972,020 | 7/1976 | Carroll et al. | 178/63 E |
| 3,993,953 | 11/1976 | Lender et al. | 375/18 |
| 4,493,092 | 1/1985 | Adams | 375/36 |
| 4,618,742 | 10/1986 | Castro | 379/97 |
| 4,675,551 | 6/1987 | Stevenson et al. | 307/561 |
| 4,849,846 | 7/1989 | Hung et al. | 379/412 |

FOREIGN PATENT DOCUMENTS 243770 4/1980 France .............................. 375/36

OTHER PUBLICATIONS

IBM Technical Disclosure Bulletin, vol. 26, No. 8, Jan. 1984, p. 3995–"Anti-Saturating ANR Cable Receiver".

Primary Examiner—Benedict V. Safourek
Attorney, Agent, or Firm—Frishauf, Holtz, Goodman & Woodward

[57] ABSTRACT

An AC coupling receiver circuit for use in a communication system comprises a comparator connected to transmission lines forming a twisted pair wire, through AC coupling capacitors, and a non-linear element connected between the transmission lines at a position close to the comparator with respect to the capacitors. When positive and negative pulses are respectively applied to the transmission lines, the voltages of the transmission lines are respectively increased and decreased to bring the non-linear element to a substantially cut-off state, thus causing the comparator output to be inverted. As the positive and negative pulses decay, the comparator output is again inverted, thus effectng signal transmission. During the application of pulses, the charge stored in the capacitors is quickly discharged through the non-linear element, whereby fluctuation of the received threshold voltage resulting from the stored charge can be eliminated even if pulse inputs are continuous. A high-reliability communication system can be realized by incorporating circuits which enable signal transmission even in the event of a short circuit or disconnection of the transmission lines.

10 Claims, 12 Drawing Sheets

FIG. 7
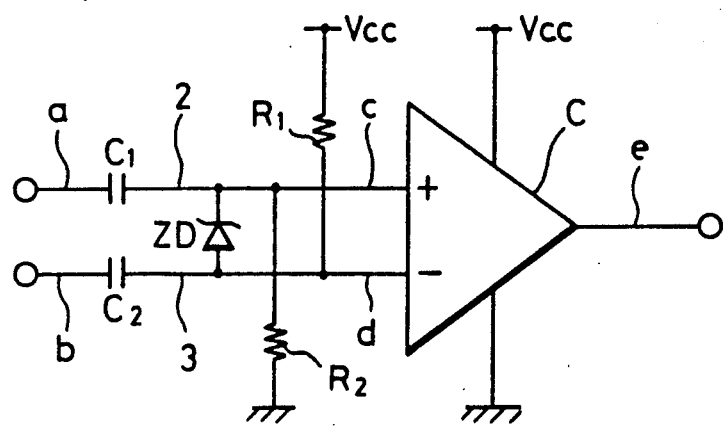
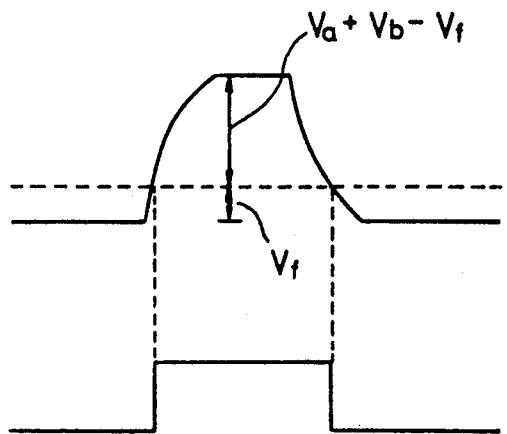
FIG.10A
FIG.10B
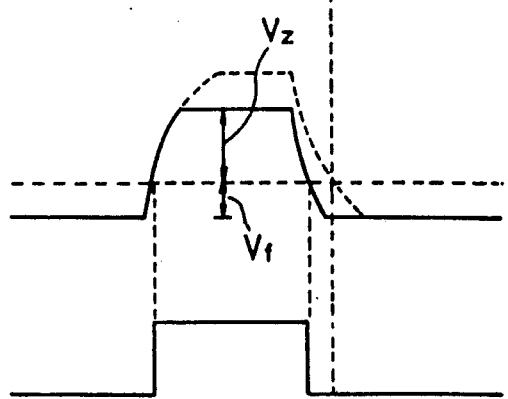
FIG.10C
FIG.10D

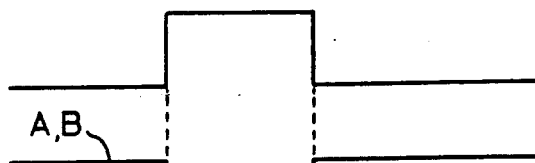
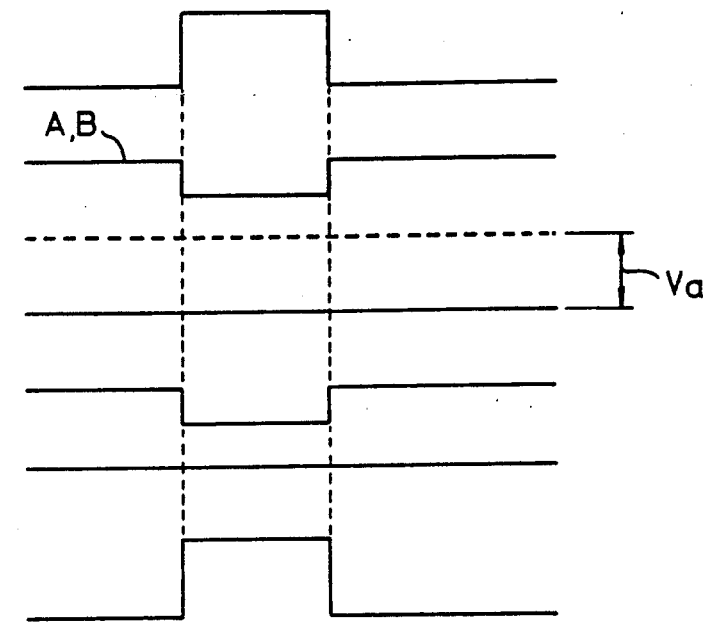
FIG. 14
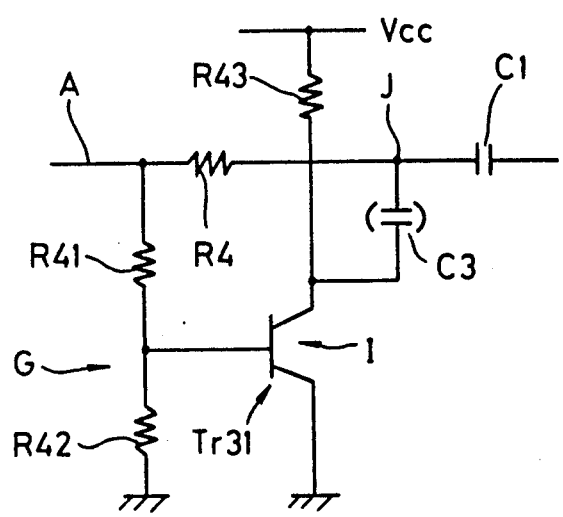

COMMUNICATION SYSTEM EQUIPPED WITH AN AC COUPLING RECEIVER CIRCUIT

BACKGROUND OF THE INVENTION

The present invention relates to a high-reliability AC coupling receiver circuit for a serial data communication system using balanced transmission lines, and to a transmitter circuit including a receiver circuit of this kind.

To improve the reliability of a data communication system, it is known to connect various units forming a communication system to one another by a balanced transmission line, e.g., a twisted pair having a pair of electric wires twisted around each other, deliver signals of opposite phases to the paired electric wires, respectively, and detect the differential between the signals as a transmission signal. This type of communication system is used also for a control system of a motor vehicle. To be used with a motor vehicle wherein the protection of human life must be given top priority, a data communication system is not only required to be satisfactorily durable and low in manufacturing cost, but also required to have high reliability, i.e., fail-safe functions, under various environments. For example, even in the event of an abnormal condition that the voltage of one of the paired transmission lines is fixed at a constant voltage, e.g., an earth potential, a power supply voltage, etc. or is opened due to the disconnection of a connector or the like, or that a short circuit occurs between the transmission lines, normal transmission functions of the various units of the system must be retained.

A bus driver/receiver of a distributed multiplex transmission system for motor vehicles is conventionally known which is equipped with a receiver circuit of the type determining the presence/absence of an input signal to the transmission lines (i.e., passive or dominant state of the transmission lines) by the voltage difference between the balanced transmission lines (see SAE, RECOMMENDED PRACTICE J—1850). In this arrangement, however, if the voltage of one transmission line is fixed at an earth potential, for example, the output logic level of the paired transmission lines is also fixed even though the logic level of the signals applied to the other transmission line varies normally, thus failing to achieve normal receiving functions and to satisfy the above-mentioned requirements for an automobile system. In view of this, an AC coupling receiver circuit is conventionally used in which a capacitor is arranged before a receiver circuit connected to the transmission lines, to enable normal reception of signals based on the output logic of a normal transmission line whose voltage is not fixed, e.g., at the earth potential, even in the case of the above-mentioned trouble. By simply connecting the capacitor, however, the direct-current level of the transmission signal changes as the signal passes through the capacitor, depending on the duty ratio of the signal, whereby the received threshold voltage to be applied to a signal processing circuit next to the capacitor varies and thus normal signal reception cannot be performed. Therefore, in this AC coupling system, measures must be taken to eliminate the fluctuation of the direct-current level, in particular, the fluctuation of the received threshold voltage caused by the charge stored in the capacitor during serial pulse transmission. For example, an arrangement illustrated in FIG. 1 is conventionally used in which signal voltages at the two signal lines are applied via an AC coupling to a differential amplifier, which preferably comprises a high-speed operational amplifier, and the voltage differential between the two signals, delivered from the differential amplifier, is subjected to level shift by another AC coupling and then is compared with a reference voltage.

According to this prior art arrangement, however, a differential amplifier comprising, e.g., a high-speed operational amplifier, must be arranged after the AC coupling, which leads to an increase in the number of component parts of the circuit and accordingly in cost and also requires a large space for arrangement.

OBJECTS AND SUMMARY OF THE INVENTION

An object of the present invention is to provide a communication system equipped with an AC coupling receiver circuit, which can prevent the fluctuation of a received threshold voltage caused by the charge stored in an AC coupling capacitor during signal transmission, and can transmit signals even in various abnormal conditions, thus providing high reliability and durability under various environments, and which is inexpensive and simple in structure with a small number of component parts and accordingly can be constructed to be small in size at low cost.

Another object of the present invention is to provide a high-reliability communication system for a variety of transmission applications including a transmission within a motor vehicle, which system is capable of signal transmission even in the event of an abnormal condition that a balanced transmission line is fixed at a constant voltage or opened, or that a short circuit occurs between the transmission lines.

Still another object of the present invention is to provide a communication system equipped with an AC coupling receiver circuit which can receive transmission signals at a high speed even if the signal waveform is rounded, and accordingly can achieve a high-speed transmission rate.

A further object of the present invention is to provide a high-reliability communication system which can be constructed by adding a minimum number of component parts to a conventional circuit, and in which the bias condition of transmission lines and the operative state of a receiver circuit can be automatically changed when abnormality occurs, to ensure signal transmission and accordingly no special logic circuit is required for the discrimination of occurrence of abnormality and for the control operation during abnormal condition.

According to one aspect of the present invention, a communication system is provided which includes a pair of transmission lines as a balanced transmission line, and at least one transmitter circuit and at least one AC coupling receiver circuit both connected to the transmission lines. The AC coupling receiver circuit comprises AC coupling capacitors connected to the paired transmission lines, respectively, voltage comparator means connected to the transmission lines through the AC coupling capacitors, and a non-linear element connected between the two transmission lines at a position close to the voltage comparator means with respect to the AC coupling capacitors. Preferably, the non-linear element comprises at least one diode or at least one Zener diode.

Preferably, the communication system according to the present invention further comprises short-circuit detection means for detecting a short circuit occurring between the two transmission lines, and a bias circuit for changing a bias condition of the two transmission lines when the short-circuit detection means detects a short circuit. The AC coupling receiver circuit includes input potential fixing means for fixing the voltage of a transmission line-side portion of the AC coupling capacitor connected to the transmission line whose bias condition is changed, at a predetermined potential when the short-circuit detection means detects a short circuit.

Still preferably, the communication system of the present invention comprises impedance altering means arranged at input sides of the AC coupling capacitors, respectively, for altering impedances of the input sides of the AC coupling capacitors. When one of the two transmission lines is opened, the impedance altering means brings the input side of the AC coupling capacitor corresponding to the open transmission line to a low impedance state. The impedance altering means preferably comprises an emitter follower circuit, and further preferably, an element is inserted at a base side of the emitter follower circuit, for causing a voltage drop.

The above and other objects, features, and advantages of the present invention will become more apparent from the ensuing detailed description taken in connection with the accompanying drawings.

BRIEF DESCRIPTION OF THE DRAWINGS

FIG. 7 is a circuit diagram showing a modification of the circuit of FIG. 6;

FIG. 10A is a waveform diagram illustrating in detail voltage changes of the first bus in the circuit of FIG. 6 when a pulse with a rounded waveform is input;

FIG. 10B is a waveform diagram illustrating output changes of the comparator in response to the bus voltage changes shown in FIG. 10A;

FIG. 10C is a diagram similar to FIG. 10A, showing bus voltage changes in the circuit of FIG. 7;

FIG. 10D is a diagram similar to FIG. 10B, showing output changes of the comparator in the circuit of FIG. 7;

FIG. 12A is a diagram showing a waveform of a digital signal input to the circuit of FIG. 11;

FIG. 12B is a diagram showing waveforms of signals in transmission lines of FIG. 11 when a short circuit occurs between the transmission lines;

FIG. 12C is a waveform diagram showing voltage changes at the input sides of capacitors of FIG. 11 when a short circuit occurs between the transmission lines;

FIG. 12D is a waveform diagram showing output changes of a comparator in FIG. 11 when a short circuit occurs between the transmission lines;

FIG. 14 is a circuit diagram illustrating an arrangement of an abnormal voltage detection circuit and switch circuit of FIG. 11;

DETAILED DESCRIPTION

Figure 1:
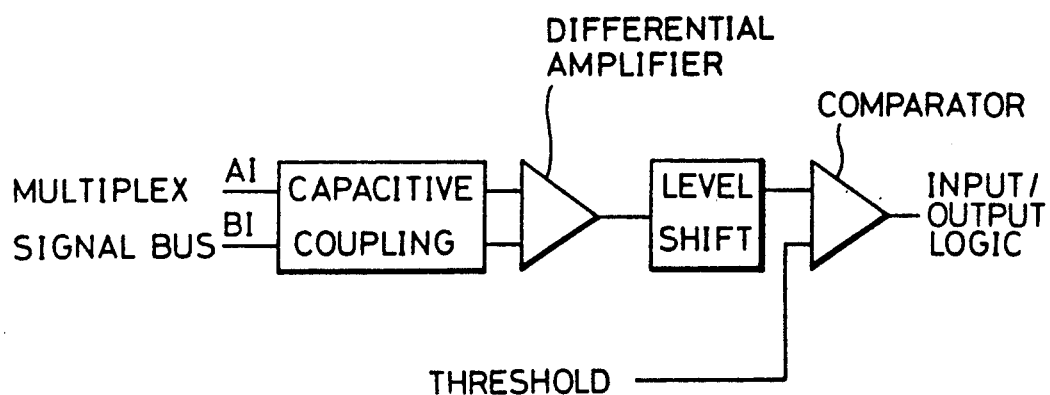
FIG. 1 is a circuit diagram of a conventional AC coupling receiver circuit.
Figure 2:
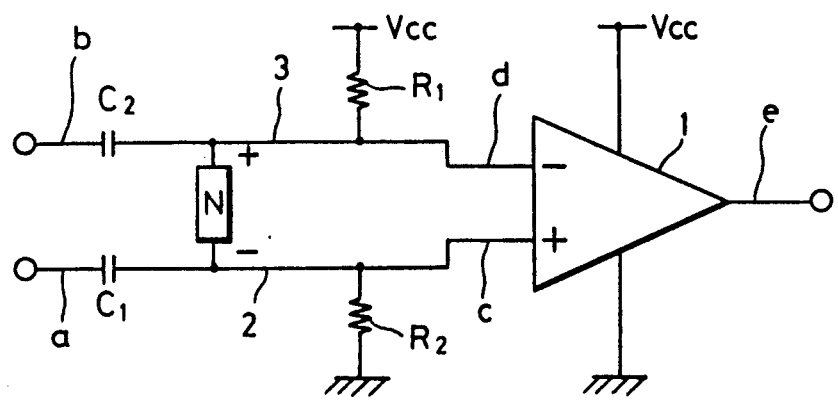
FIG. 2 is a circuit diagram of an AC coupling receiver circuit according to a first embodiment of the present invention.

Referring to FIG. 2, an AC coupling receiver circuit for use in a communication system, according to a first embodiment of the present invention, comprises a voltage comparator means 1 which has an output terminal e, a non-inverted input terminal c connected to a first bus 2 serving as a signal transmission line, and an inverted input terminal d connected to a second bus 3 also serving as a signal transmission line. The first and second buses 2 and 3 constitute a twisted pair wire, for example, and have AC coupling capacitors C1 and C2 arranged therein, respectively. A non-linear element N is connected between the first and second buses 2 and 3 in a position close to the voltage comparator means 1 with respect to the capacitors C1 and C2, respectively. Specifically, the non-linear element N has a positive terminal (indicated by "+" in FIG. 2) connected to the second bus 3, and a negative terminal (indicated by "−" in FIG. 2) connected to the first bus 2. A resistor R2 is connected at one end to a portion of the first bus 2 between the non-linear element N and the voltage comparator means 1, and is grounded at the other end thereof. A pull-up power supply Vcc is connected through a resistor R1 to a portion of the second bus 3 between the non-linear element N and the voltage comparator means 1. The non-linear element N is composed of a diode, a Zener diode, or the like; alternatively, the element N may include a plurality of diodes, Zener diodes or the like, arranged in series, if required.

The receiver circuit is adapted to receive a pair of signals of opposite phases from a transmitter circuit (not shown) connected to input terminals a and b of the first and second buses 2 and 3, as described later with reference to other embodiments of the present invention. In this embodiment, positive and negative serial pulses are respectively applied to the first and second buses 2 and 3.

Figure 3:
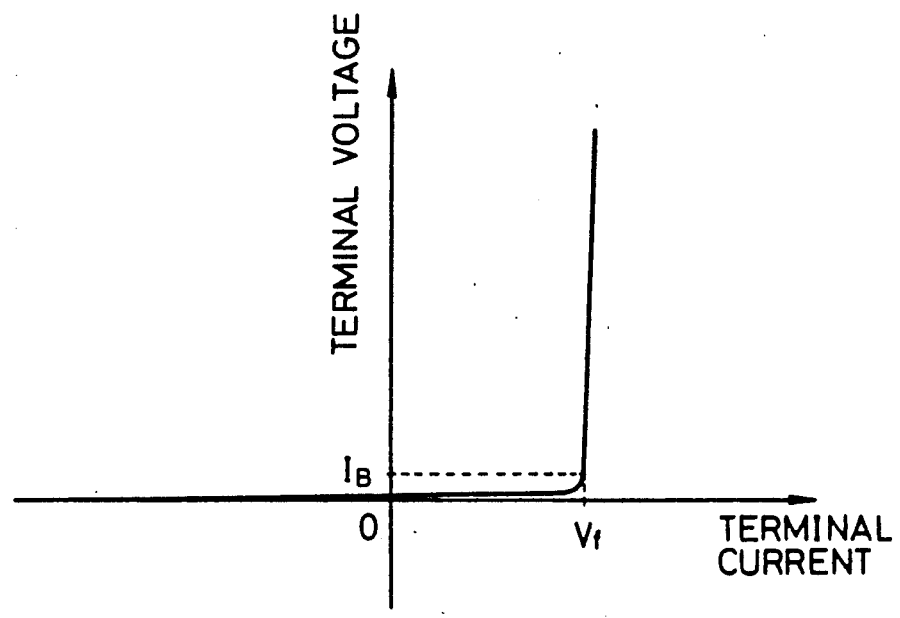
FIG. 3 is a graph showing a voltage-current characteristic of a non-linear element appearing in FIG. 2.

FIG. 3 shows a voltage-current characteristic of the non-linear element N, wherein the voltage at the + terminal is defined as a positive voltage and electric current flowing from the + terminal to the − terminal is defined as a positive current. As is clear from the figure, the non-linear element N has the characteristic that current suddenly starts to flow when the terminal voltage exceeds a voltage Vf.

The resistors R1 and R2 are provided for passing a bias current $I_B$ through the non-linear element N even during the absence of input signals, to develop a voltage approximately equal to the voltage Vf between the terminals of the element N. Instead of using the resistors R1 and R2, other suitable elements may be provided to produce the bias current.

The voltage comparator means 1 is adapted to compare the difference $V_{DEF}$ between the voltages at the non-inverted input terminal and the inverted input terminal thereof with a threshold voltage $V_{TH}$. The voltage comparator means 1 outputs a high-level voltage from the output terminal e thereof when $V_{DEF} > V_{TH}$ stands, and outputs a low-level voltage from the terminal e when $V_{DEF} < V_{TH}$ stands. Of course, to reduce the influence of noise, the threshold voltage $V_{TH}$ when the output voltage is inverted from low level to high level may be set to a value higher by $\Delta V_H$ than that when the output voltage is inverted from high level to low level, to obtain a hysteresis characteristic.

The operation of the AC coupling receiver circuit will be described. For the sake of simplicity, the following description is based on the assumption that the threshold voltage $V_{TH}$ of the voltage comparator means 1 is 0 (zero). In this case, the voltage comparator means 1 outputs a high-level voltage from the output terminal e thereof when the voltage at the input terminal c is higher than that at the other input terminal d, and outputs a low-level voltage when the former is lower than the latter.

In the absence of input signals, that is, when no pulses are input to the first and second buses 2 and 3, the bias current $I_B$ flows from the pull-up power supply Vcc to the resistor R2 through the resistor R1 and the non-linear element N, and accordingly a voltage approximately equal to the voltage Vf is induced between the input terminals c and d of the voltage comparator means 1. At this time, a low-level output appears at the output terminal e of the voltage comparator means 1 (FIG. 4C).

Figure 4A:
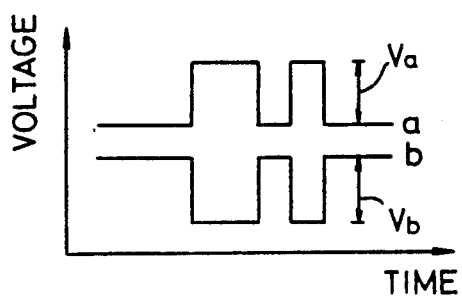
FIG. 4A is a waveform diagram showing changes of voltages of first and second buses in FIG. 2.
Figure 4B:
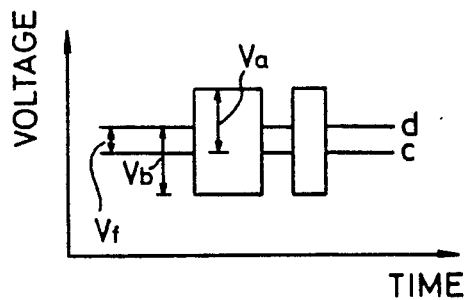
FIG. 4B is a waveform diagram showing changes of voltages at the input terminals of a comparator shown in FIG. 2, in response to pulse inputs.
Figure 4C:
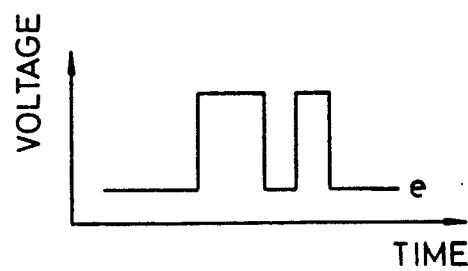
FIG. 4C is a waveform diagram showing changes of outputs of the comparator in response to pulse inputs.

If a positive pulse having a crest value Va and a negative pulse having a crest value Vb are applied to the first and second buses 2 and 3, respectively, as shown in FIG. 4A, the voltage at the negative terminal of the non-linear element N increases by Va and the voltage at the positive terminal thereof decreases by Vb, from their respective values during the absence of input signals. As a result, a voltage equal to the difference between the sum of the crest values Va and Vb of the positive and negative pulses and the voltage Vf produced by the non-linear element N (i.e., Va+Vb−Vf) is applied to the non-linear element N as a reverse voltage, and thus almost no current flows through the non-linear element N. At this time, a voltage between the input terminals c and d of the voltage comparator means 1 changes to Va+Vb−Vf having a polarity opposite to that produced during the absence of input signals, and a high-level output appears at the output terminal e of the comparator 1, as shown in FIGS. 4B and 4C. That is, the output of the terminal e is inverted. This output inversion takes place when the sum of the amounts of changes in the voltages of the first and second buses 2 and 3 exceeds the voltage Vf produced by the non-linear element N. This also applies to the case where the threshold voltage $V_{TH}$ of the voltage comparator means 1 is not equal to 0 (zero); that is, the inversion of the output of the terminal e occurs when the sum of the amounts of changes in the voltages of the first and second buses 2 and 3 exceeds $Vf + V_{TH}$.

When substantially no current flows in the non-linear element N, the capacitor C1 arranged in the first bus 2 is charged through the resistor R2 in such a direction that the cathode voltage at the negative terminal of the non-linear element N is lowered, while the capacitor C2 of the second bus 3 is charged through the resistor R1 in such a direction that the anode voltage at the positive terminal is increased.

Upon completion of the application of current pulses to the first and second buses 2 and 3, the circuit resumes the initial state (with no signals applied thereto) wherein the voltage Vf is applied to the non-linear element N, thus providing a low-level output at the terminal e. After the current pulse input ends, the charge of the capacitors C1 and C2 stored while the non-linear element N was in a substantially cut-off state is quickly discharged through the non-linear element N, which is now in a conductive state with its terminal voltage increased above the level Vf. In other words, the terminal voltage increased above the level Vf. In other words, the terminal voltage of the capacitors C1 and C2 which has been increased in response to the input of the current pulses is returned to the initial zero level in a moment. Therefore, even if pulses are successively input at short intervals of time (FIG. 4A shows the case where two pulses with different pulse widths are successively input), the discharge time of the capacitors C1 and C2 does not change significantly.

Now, the operation of the receiver circuit when abnormality occurs, for example, when the voltage of one of the buses, e.g., the second bus 3, is fixed at a constant value (e.g., earth potential) will be described with reference to FIGS. 5A to 5C. The following description is based on the assumption that the threshold voltage $V_{TH}$ of the voltage comparator means 1 is 0 (zero), for the sake of simplicity.

Figure 5A:
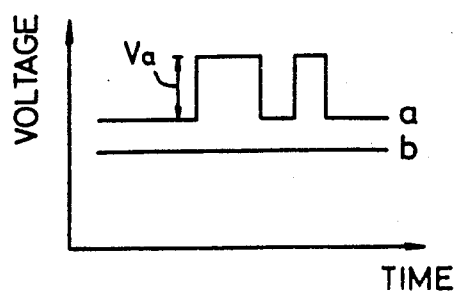
FIG. 5A is a diagram similar to FIG. 4A, showing voltage changes when the voltage of the second bus of FIG. 2 is fixed at a constant voltage.
Figure 5B:
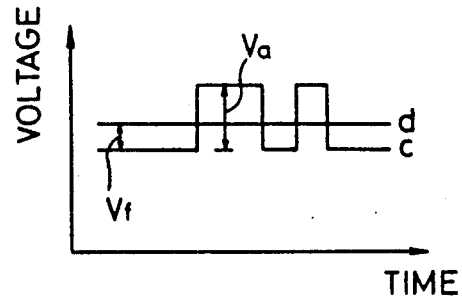
FIG. 5B is a diagram similar to FIG. 4B, showing voltage changes when the voltage of the second bus is fixed at a constant voltage.
Figure 5C:
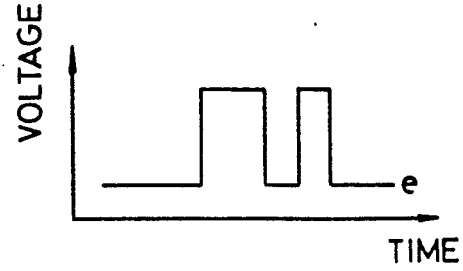
FIG. 5C is a diagram similar to FIG. 4C, showing output changes when the voltage of the second bus is fixed at a constant voltage.

As shown in FIG. 5A, in response to pulse inputs, the voltage of the first bus 2 is increased by the crest value Va of the positive input pulse from the level at the time of absence of input signals, but the voltage at the input terminal b of the second bus 3 (abnormal bus) remains fixed at a constant value regardless of presence/absence of pulse input. As a result, the voltage applied to the input terminal c of the voltage comparator means 1 increases by the value Va from the level during the absence of input signals, in response to a pulse input, whereas the voltage applied to the non-inverted input terminal d is fixed at a constant level, as shown in FIG. 5B. The receiver circuit is constructed such that the crest value Va of the positive pulse applied to the first bus 2 is greater than the voltage Vf produced by the non-linear element N, that is, the relationship Va>Vf is fulfilled. Accordingly, the voltage levels of the input terminals c and d of the voltage comparator means 1 cross each other between the time of absence of input pulses and the time when positive pulses are input. In the case where the threshold voltage $V_{TH}$ of the voltage comparator means 1 is not equal to 0 (zero), the receiver circuit may be constructed such that the relationship Va>Vf+$V_{TH}$ is fulfilled, to obtain similar results. Thus, when a positive pulse is input, the output of the terminal e is inverted from low-level (the level during the absence of input pulses) to high-level. The operation of the receiver circuit described above is substantially the same as in the case where the voltage of the first bus 2 is fixed at a constant level. Thus, even if the voltage of one of the buses is fixed at a constant voltage, the output level of the receiver circuit changes in exact response to the presence/absence of the pulse which is input properly, and the receiver circuit operates in substantially the same manner as in the case where positive and negative pulses are properly input thereto. The connections of the terminals c and d of the voltage comparator means 1 of FIG. 2 with respect to the buses may be reversed, if an opposite logic output need be provided at the terminal e.

Figure 6:
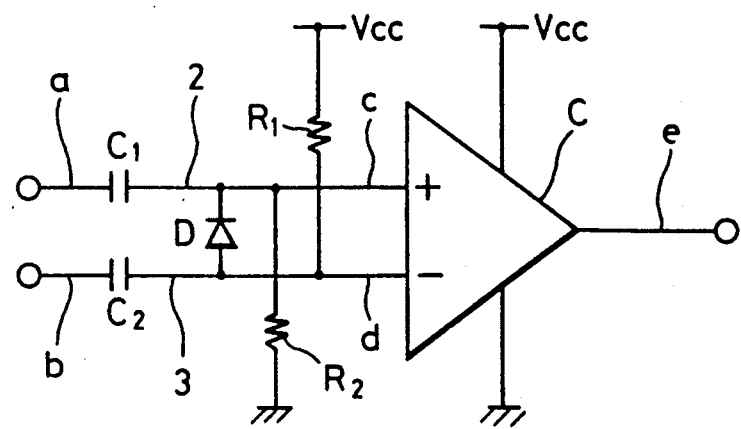
FIG. 6 is a circuit diagram showing an example of the circuit arrangement of FIG. 2.

FIG. 6 shows an example of the circuit of FIG. 2, in which a diode D and a comparator C are used as the non-linear element N and the voltage comparator means 1, respectively. In this arrangement, the voltages Vf and $V_{TH}$ are set to about 0.6 V and 0 (zero) V, respectively, and therefore, when the sum of the amounts of changes in the voltages of the first and second buses 2 and 3 exceeds a predetermined value of about 0.6 V, the output of the terminal e of the comparator C changes from low level to high level.

FIG. 7 shows a modification of the circuit of FIG. 6, in which a Zener diode ZD is used in place of the diode D, to improve the transmission rate.

Figure 8A:
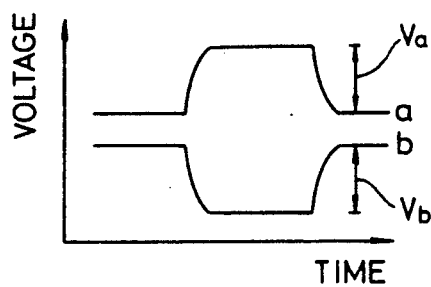
FIG. 8A is a waveform diagram showing voltage changes of the first and second buses in the circuit of FIG. 6 when a pulse with a rounded waveform is input.
Figure 9A:
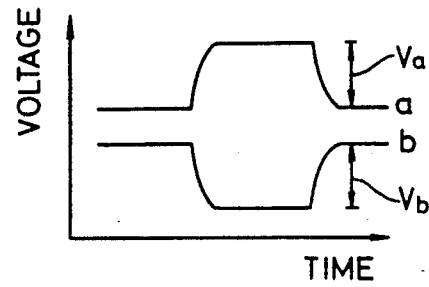
FIG. 9A is a diagram similar to FIG. 8A, showing voltage changes of the first and second buses in the circuit of FIG. 7.

The reason why the receiver circuit of FIG. 7 has a high transmission rate will be explained in comparison with the circuit of FIG. 6. Let it be assumed that, in the circuits of FIGS. 6 and 7, positive and negative pulses each having rounded leading and trailing edges are applied to the input terminals a and b of the first and second buses 2 and 3, respectively, as shown in FIGS. 8A and 9A.

Figure 8B:
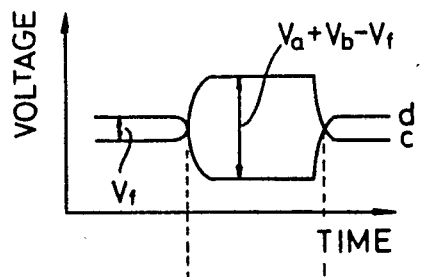
FIG. 8B is a waveform diagram showing voltage changes at the input terminals of the comparator in the circuit of FIG. 6 when a pulse with a rounded waveform is input.
Figure 9B:
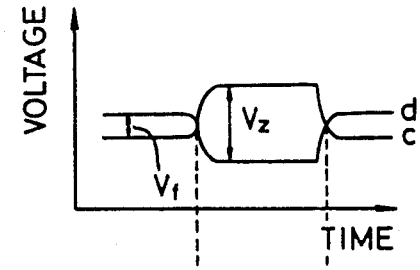
FIG. 9B is a diagram similar to FIG. 8B, showing voltage changes at the input terminals of a comparator in the circuit of FIG. 7.
Figure 8C:
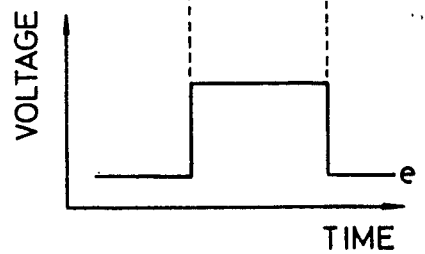
FIG. 8C is a waveform diagram showing output changes of the comparator in the circuit of FIG. 6 when a pulse with a rounded waveform is input.
Figure 9C:
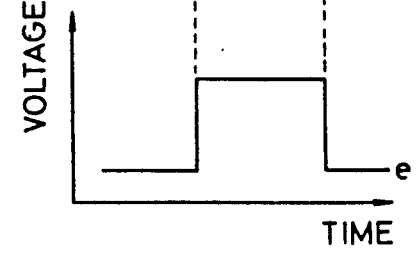
FIG. 9C is a diagram similar to FIG. 8C, showing output changes of the comparator in the circuit of FIG. 7.

As the positive and negative pulses are input, a voltage which increases by the crest value Va of the positive pulse from the level of absence of input pulses in accordance with the waveform of the rising portion of the positive pulse is applied to the non-inverted input terminal c of the comparator C, and a voltage which decreases by the crest value Vb of the negative pulse from the level of absence of input pulse in accordance with the waveform of the falling portion of the negative pulse is applied to the inverted input terminal of the d of the comparator C (FIGS. 8B and 9B). When the relationship in magnitude of the levels of the voltage applied to the input terminals c and d are reversed from that during the absence of input pulses, the output of the comparator C changes from low level to high level (FIGS. 8C and 9C). These operations are common to both the circuits of FIGS. 6 and 7, and therefore, the outputs of the comparators in these circuits are inverted at the same time in response to the application of positive and negative pulses.

In the circuit of FIG. 6, however, the voltages at the input terminals c and d of the comparator C increase and decrease, respectively, until the voltage across these input terminals reaches the value (Va+Vb−Vf) (FIGS. 8B and 10A). In the circuit of FIG. 7, in contrast, the voltages at the input terminals of the comparator C stop increasing and decreasing, respectively, when the voltage across the input terminals of the comparator reaches a Zener voltage Vz of the Zener diode ZD (FIGS. 9B and 10C). When the positive and negative pulses decay in the circuits of FIGS. 6 and 7, the voltages at the input terminals c and d of the comparators C respectively decrease and increase in accordance with the falling and rising characteristics of the positive and negative pulses, respectively. Thus, although the circuits of FIGS. 6 and 7 are similar in operation when pulses decay, pulse-rise and pulse-fall start voltage levels (FIG. 10C) of the input terminals c and d of the comparator C are smaller in the circuit of FIG. 7 using the Zener diode ZD, than the corresponding voltage levels (FIG. 10A) of the input terminals of the comparator C of FIG. 6, due to the above-mentioned difference. Accordingly, the timing of inversion of the output level of the comparator during decay of pulses is earlier in the circuit of FIG. 7 (FIG. 10D) than in the circuit of FIG. 6 (FIG. 10B), and thus the circuit of FIG. 7 has a higher transmission rate.

A transmitter circuit according to a second embodiment of the present invention will now be described with reference to FIG. 11.

Figure 11:
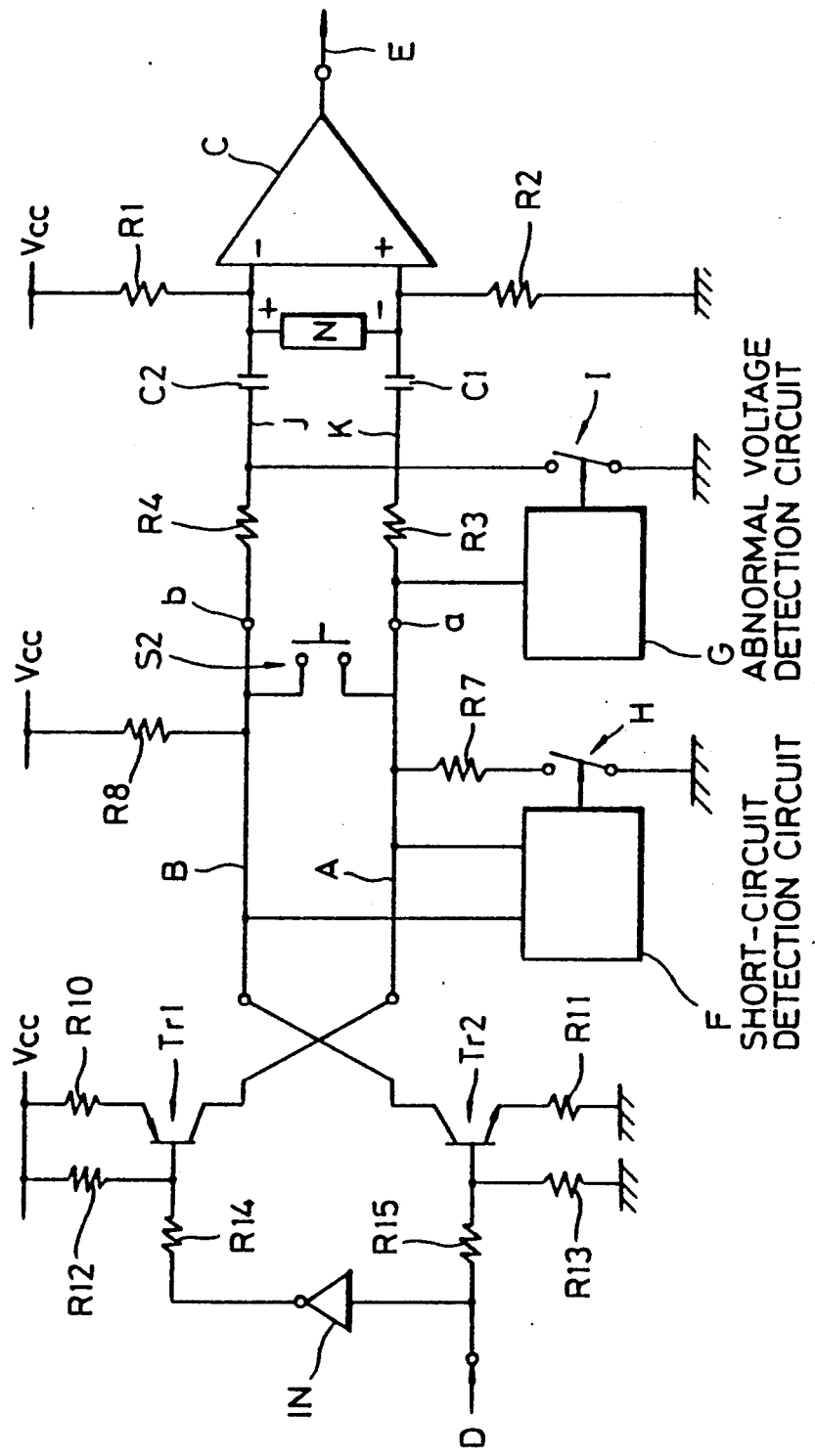
FIG. 11 is a circuit diagram of a transmitter circuit according to a second embodiment of the present invention.

In FIG. 11, which shows the transmitter circuit provided in a unit of a data transmission system, the base of a transistor Tr1 is connected to the input terminal of the transmitter circuit through a resistor R14 and an inverter IN, and also connected to a power supply Vcc through a resistor R12. The emitter of the transistor Tr1 is connected to the power supply Vcc through a resistor R10. The base of another transistor Tr2 is connected to the input terminal of the transmitter circuit through a resistor R15, and is grounded via a resistor R13. The emitter of the transistor Tr2 is grounded via a resistor R11. The collectors of the transistors Tr1 and Tr2 are connected to respective output terminals of the transmitter circuit.

Transmission lines A and B, which may be a twist pair wire or a similar transmission line of a balanced type, are connected at one end to the respective output terminals of the transmitter circuit and connected at another end to input terminals a and b of a receiver circuit, respectively. The receiver circuit has an arrangement fundamentally similar to that shown in FIG. 2 and is constructed such that it can transmit signals even if one of the transmission lines A and B is short-circuited to a fixed voltage such as an earth potential. As distinct from the circuit of FIG. 2, the receiver circuit of FIG. 11 includes resistors R3 and R4 connected respectively between the input terminal a and an AC coupling capacitor C1 and between the input terminal b and an AC coupling capacitor C2. The transmission line B is connected to the power supply Vcc through a resistor R8, and the transmission line A is grounded via a resistor R7 and a switch circuit H.

A short-circuit detection circuit F is connected between input-side portions of the transmission lines A and B, i.e., between the portions thereof on the side of the two output terminals of the transmitter circuit, and is adapted to open the switch circuit H when it detects a short circuit between the transmission lines A and B. Also, a switch S2 is connected between output-side portions of the transmission lines A and B, i.e., between the portions thereof on the side of the input terminals a and b of the receiver circuit (the switch S2 is illustrated for the sake of explanation only, to indicate a short-circuited condition and accordingly is not an element actually provided in the circuit).

In the receiver circuit, an abnormal voltage detection circuit G is connected to a portion of the transmission line A close to the switch circuit H. A switch circuit I is connected at one end to the connection point between the resistor R4 of the receiver circuit connected to the transmission line B and the capacitor C2, and has another end grounded. The switch circuit I serves to short circuit the connection point to the earth potential, through or not through a capacitor under the control of the detection circuit G.

The transmitter circuit of FIG. 11 operates as follows:

When the transmission lines A and B are not short-circuited and are in a normal state, both the short-circuit detection circuit F and the abnormal voltage detection circuit G are inoperative, and accordingly the switch circuit H is in a closed state and the switch circuit I is in an open state. Therefore, in this state, the transmitter circuit operates in the same manner as the circuit of FIG. 2.

If the switch S2 is closed to cause a short circuit between the transmission lines A and B, for example, the short-circuit detection circuit F detects this short circuit and causes the switch circuit H to open. As a result, the transmission line A is connected to the power supply Vcc through the switch S2 and the resistor R8, so that its voltage rises up to the level of the power supply Vcc. If, at this time, a digital signal D (FIG. 12A) is applied from a digital circuit (not shown) to the transmitter circuit, the current is not discharged from the transistor Tr1 because the voltage of the transmission line A is increased approximately to the level of the power supply Vcc, and accordingly the transistor Tr1 can be regarded as being turned off. On the other hand, the transistor Tr2 is turned on, and thus the signal at the transmission line B has a waveform as shown in FIG. 12B. Since the transmission line A is connected to the transmission line B through the switch S2, the signal waveforms of the transmission lines A and B are both similar to a normal signal waveform of the transmission line B, as shown in FIG. 12B.

Since the voltage of the transmission line A is increased from a normal voltage range indicated by the broken line in FIG. 12B, the abnormal voltage detection circuit G connected to the transmission line A is operated to close the switch circuit I and thus connect the transmission line B to the earth potential. As a result, no signal appears at an input J of the receiver circuit, and accordingly the voltage difference between the inputs J and K of the receiver circuit (FIG. 12C) is similar to that observed in the case of short-circuiting the second bus 3 of the circuit of FIG. 2 to the earth potential, so that the receiver circuit outputs a signal E (FIG. 12D). In this manner, the digital signal D transmitter from the digital circuit can be reproduced as the signal E, thus enabling signal transmission through the transmitter circuit.

Figure 13A:
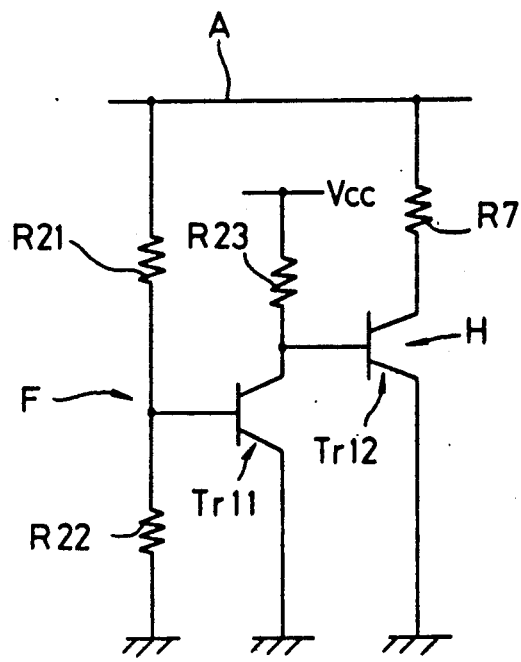
FIG. 13A is a circuit diagram illustrating an arrangement of a short-circuit detection circuit and a switch circuit shown in FIG. 11.
Figure 13B:
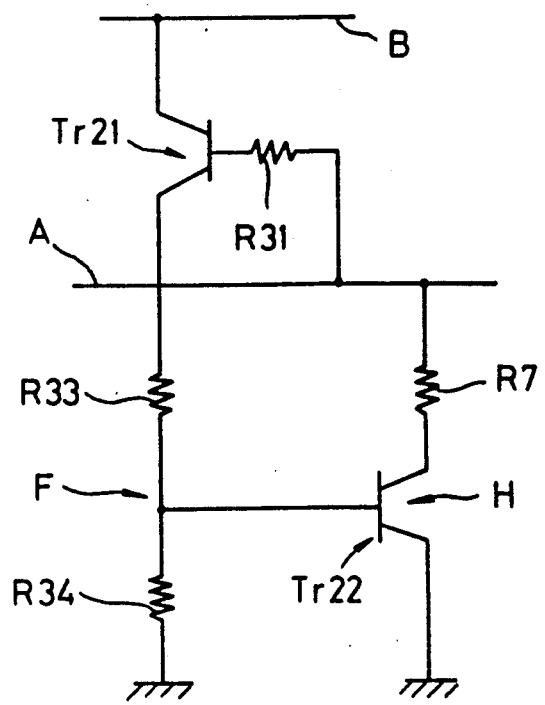
FIG. 13B is a circuit diagram illustrating another example of the circuit arrangement of FIG. 11.

FIGS. 13A and 13B each show an example of arrangement of the switch circuit H and the short-circuit detection circuit F appearing in FIG. 11. In FIG. 13A, the short-circuit detection circuit F comprises resistors R21 and R22 as a voltage divider, connected in series between the transmission line A and an earth potential, and a transistor Tr11. The collector of the transistor Tr11 is connected to the power supply Vcc through a resistor 23, the base is connected to the connection point between the resistors R21 and R22, and the emitter is grounded. The switch circuit H comprises a transistor Tr12 having a collector thereof connected to the bias resistor R7, a base thereof connected to the collector of the transistor Tr11 of the short-circuit detection circuit F, and an emitter thereof grounded.

When the voltage of the transmission line A is low, the voltage divided by the resistors R21 and R22 is not high enough to turn on the transistor Tr11, while the transistor Tr12 is supplied with the base current through the resistor R23 and accordingly is turned on. Therefore, the switch circuit H is closed when the transmission lines A and B are in a normal state.

If a short circuit occurs between the transmission lines A and B, the voltage of the transmission line A rises to a value Vcc/2 equal to the voltage obtained by dividing the power supply voltage Vcc by the bias resistors R8 and R7 in FIG. 11. Accordingly, the base voltage of the transistor Tr11 becomes high enough to turn on the transistor Tr11, whereas the transistor Tr12 is turned off, and hence the switch circuit H is opened. The circuit of this embodiment has the function of preventing the resistors R8 from being heated by an excessive current flowing therethrough when the transmission line A is short-circuited to a high voltage.

The short-circuit detection circuit F shown in FIG. 13B comprises a transistor 21 having a base thereof connected to the transmission line A through a resistor R31, an emitter thereof connected to the transmission line B, and a collector thereof grounded via resistors R33 and R34 as a voltage divider. The switch circuit H comprises a transistor Tr22 having a collector thereof connected to the bias resistor R7, a base thereof connected to the connection point between the resistors R33 and R34, and an emitter thereof grounded.

When the transmission lines A and B are in a normal state, a sufficient potential difference is present between the transmission lines A and B. Accordingly, the transistor Tr21 is turned on to cause the base current to flow through the transistor Tr22, thereby turning on the transistor Tr22. Thus, the switch circuit H is closed.

If the transmission line B is short-circuited to the transmission line A and accordingly the potential difference between the two transmission lines becomes 0 (zero), the transistor Tr21 is turned off and thus the transistor Tr22 is turned off, whereby the switch circuit H is opened.

FIG. 14 is an example of arrangement of the abnormal voltage detection circuit G and the switch circuit I shown in FIG. 11. The detection circuit G comprises resistors R41 and R42 as a voltage divider, connected between the transmission line A and the ground potential, and the switch circuit I comprises a transistor Tr31.

The collector of the transistor Tr31 is connected to the power supply Vcc through a resistor R43, the base is connected to the connection point between the voltage-dividing resistors R41 and R42, and the emitter of the transistor Tr31 is grounded. In this arrangement, when the voltage of the transmission line A exceeds a given voltage, the transistor Tr31 is turned on by the voltage divided by the resistors R41 and R42 and thus the point J is short-circuited to the earth potential. If d.c. short-circuited of the point J to the earth potential need be avoided on such occasion, a capacitor C3 (indicated by the parentheses in FIG. 14) may be arranged between the point J and the collector of the transistor Tr31.

The switch circuit H, the short-circuit detection circuit F, the abnormal voltage detection circuit G, and the switch circuit I may not necessarily be connected to the transmission line A; they may alternatively be connected to the transmission line B with their polarities changed.

A transmitter/receiver circuit according to a third embodiment of the present invention will now be described with reference to FIG. 15.

A transmitter/receiver circuit of this embodiment is characterized in that signal transmission is possible even when one of the transmission lines is open, thereby further improving the reliability of the system. More specifically, this embodiment is intended to eliminate the inconvenience of the receiver circuit of FIG. 2 that although signal transmission is possible when one of the transmission lines is fixed at a constant voltage, signals cannot be transmitted when one of the transmission lines is open. According to the circuit of FIG. 2, if the transmission line A is disconnected at a position corresponding to the symbol S in FIG. 15, for example, the impedance of the comparator at the input terminal thereof corresponding to the disconnected transmission line A is increased. Accordingly, when input signals are applied, the diode becomes cut-off, but the potential of the above-mentioned input terminal of the comparator drops since it is pulled down by the resistor. As a result, the voltage levels at both sides of the diode do not cross each other, that is, the output of the comparator is not inverted, thus failing to perform normal transmission.

Figure 15:
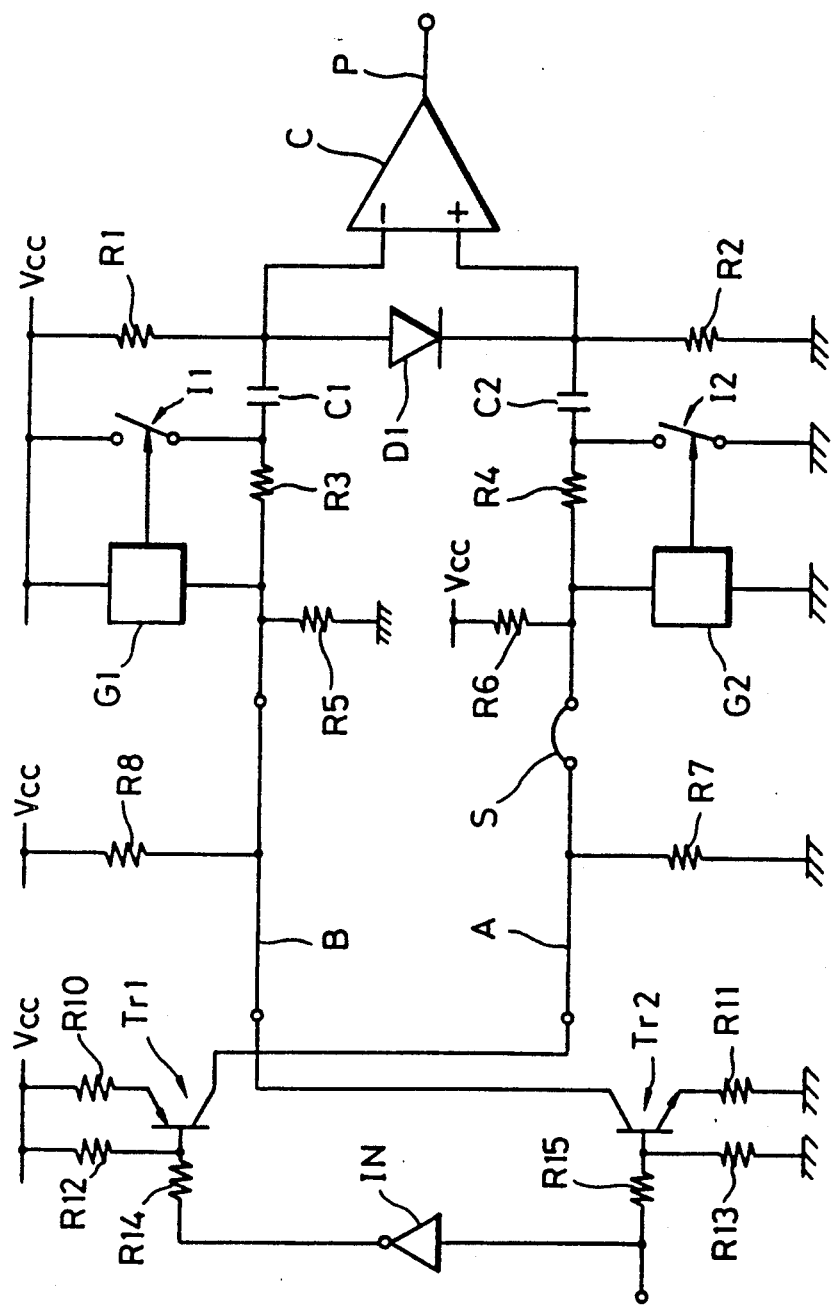
FIG. 15 is a circuit diagram illustrating a transmitter/receiver circuit according to a third embodiment of the present invention.

In the arrangement of FIG. 15, the transmitter circuit has a similar arrangement to that of FIG. 11, whereas the receiver circuit includes the elements described later, in addition to those contained in the AC coupling receiver circuit of FIG. 2. The transmission line A is grounded via the bias resistor R7, and the transmission line B is connected to the power supply Vcc through the bias resistor R8. The connection point between the capacitor C1 and the resistor R3 is connected to the power supply Vcc through a switch circuit I1, and the connection point between the capacitor C2 and the resistor R4 is grounded via a switch circuit I2. The input side of the resistor R3 is connected the power supply Vcc through an abnormal voltage detection circuit G1, and is also connected to an earth potential via the resistor R5. The input side of the resistor R4 is grounded via an abnormal voltage detection circuit G2, and is connected to the power supply Vcc through the resistor R6.

The switch circuits I1 and I2 serve to cause d.c. short-circuiting or a.c. short-circuiting of the above-mentioned two connection points to a fixed voltage, and the abnormal voltage detection circuits G1 and G2 are adapted to close the switch circuits I1 and I2, respectively, when they detect an increase of the voltages of the transmission lines A and B above respective predetermined voltages. The combination of the switch circuit I1 and the detection circuit G1 and the combination of the switch circuit I2 and the detection circuit G2 respectively constitute an impedance altering means.

The circuit of FIG. 15 operates as follows:

The voltages of the transmission lines A and B are usually close to the earth potential and the power supply voltage Vcc, respectively, due to relatively low resistance of the bias resistors R7 and R8. In such cases, the abnormal voltage detection circuits G1 and G2 are not operated. The transmission lines A and B are respectively connected to the earth potential and the power supply Vcc through the resistors R5 and R6 with relatively high resistance, and also connected to the AC coupling receiver circuit through the resistors R3 and R4 with relatively low resistance, respectively. Thus, the circuit operates in the same manner as the receiver circuit of FIG. 2.

If the transmission line A is opened at a position corresponding to the symbol "S", for example, the potential at the connection point between the resistor R6 and the abnormal voltage detection circuit G2 is increased to approximately about the power supply voltage Vcc through the resistor R6. Accordingly, the detection circuit G2 is operated to close the switch circuit I2. The operation of the receiver circuit is thereafter the same as in the case where one of the transmission lines is short-circuited to the earth potential, described with reference to FIG. 2, permitting signal reception. The receiver circuit carries out a similar operation when the transmission line B is opened, but with the polarity of the circuit reversed, thus also permitting signal reception.

Figure 16:
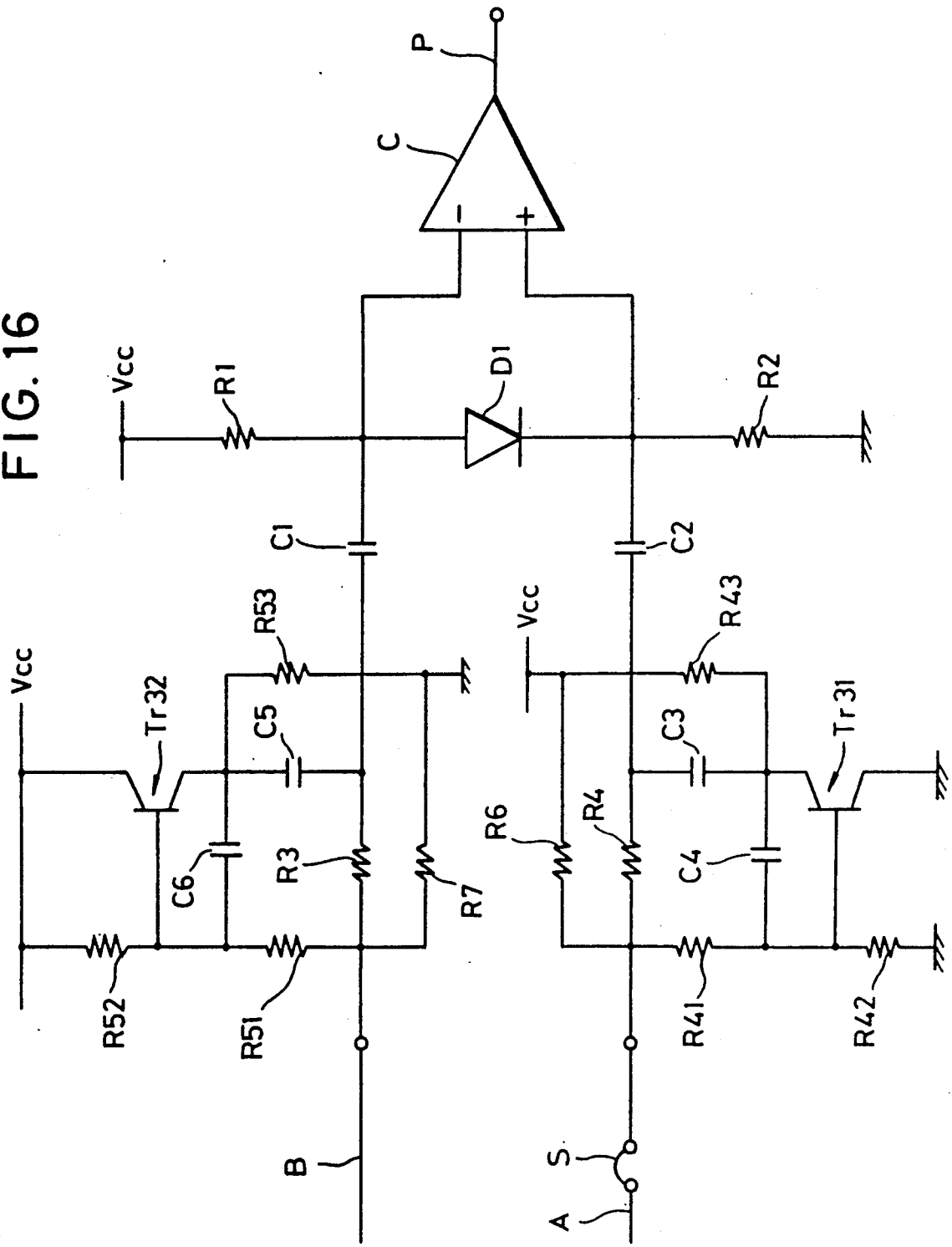
FIG. 16 is a circuit diagram illustrating an arrangement of a switch circuit and an abnormal voltage detection circuit in FIG. 15.

FIGS. 16 shows an example of the arrangement including the switch circuits I1 and I2 and the abnormal voltage detection circuits G1 and G2 shown in FIG. 15.

In the arrangement of FIG. 16, a transistor Tr32 has an emitter thereof connected to the power supply Vcc, and a collector thereof connected through a capacitor C5 to one side of the resistor R3 close to the capacitor C1, and also connected to the earth potential via a resistor R53. Between the resistor R3 and the power supply Vcc, a voltage divider comprising resistors R51 and R52 is arranged, and the connection point between the resistors R51 and R52 is connected to the base of the transistor Tr32 and also connected through the capacitor C6 to the collector of the same transistor Tr32. The transistor Tr32, the capacitors C5 and C6, and the resistor R53 constitute the switch circuit I1, and the resistors R51 and R52 constitute the abnormal voltage detection circuit G1.

A transistor Tr31 has an emitter thereof grounded, and a collector thereof connected through the capacitor C3 to one side of the resistor R4 close to the capacitor C2 and also connected to the power supply Vcc through a resistor R43. A voltage divider composed of resistors R41 and R42 is connected between the input terminal of the resistor R4 and the ground potential, and the connection point between these resistors R41 and R42 is connected to the base of the transistor Tr31 and also connected through the capacitor C4 to the collector of the same transistor. The transistor Tr31, the capacitors C3 and C4, and the resistor R43 constitute the switch circuit I2, and the resistors R41 and R42 constitute the abnormal voltage detection circuit G2.

When the transmission line A is properly connected, the voltage thereof is low and accordingly the base current is given by the voltage divided by the resistors R41 and R42, whereby the transistor Tr31 is turned off. If the transmission line A is opened at the position corresponding to the symbol "S", current flows from the power supply Vcc to the base of the transistor Tr31 through the resistor R6, thus turning on the transistor Tr31. As a result, the input side of the capacitor C2 close to the transistor Tr1 is short-circuited to the earth potential, and accordingly the connection point between the resistor R4 and the capacitor C3 is a.c. short-circuited to the earth potential through the capacitor C3.

The capacitor C4 has the function of maintaining the above-mentioned a.c. short-circuited state of the connection point for a certain time after the voltage returns to the normal level from an abnormal value. Therefore, in the case where the open state and the normal state of the transmission line A are alternately repeated at short intervals of time, the capacitor C4 serves to maintain the short-circuited state of the above connection point, thereby enabling the receiver circuit to receive signals.

Figure 17:
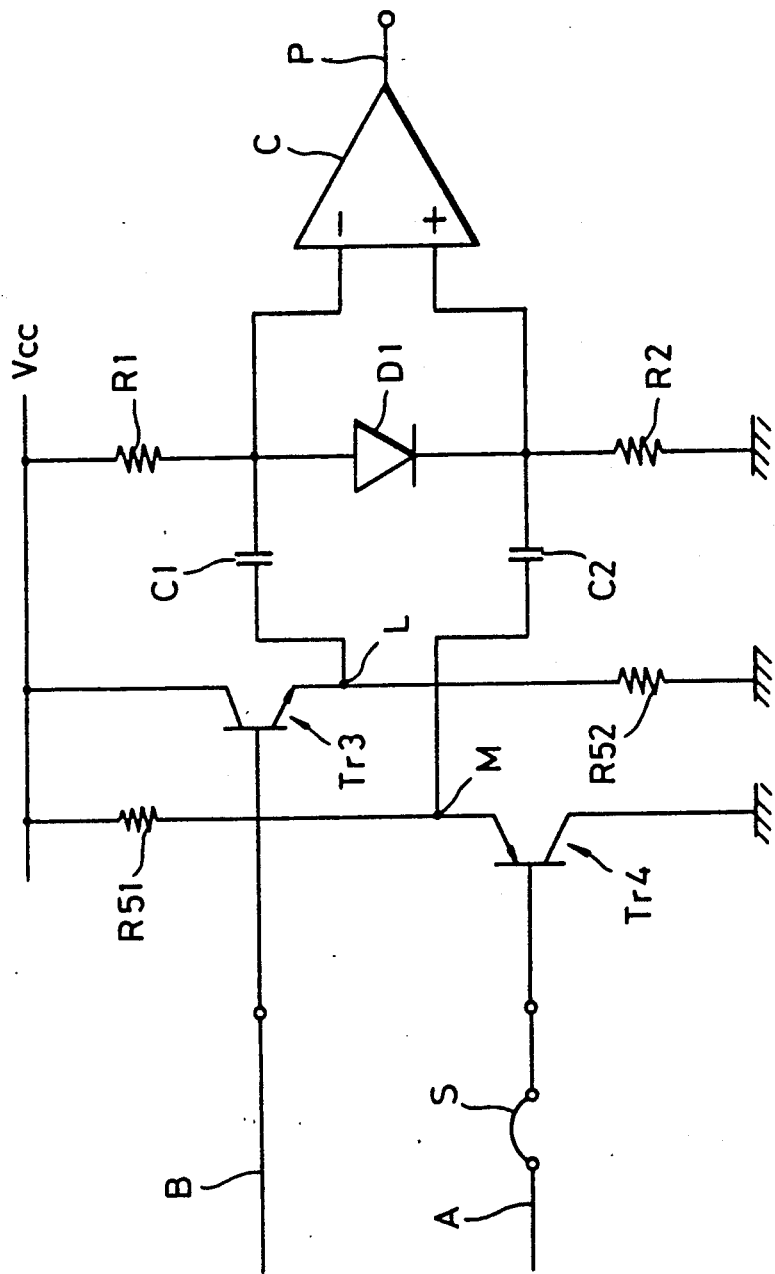
FIG. 17 is a circuit diagram illustrating a modification of the circuit of FIG. 15.

FIG. 17 shows a modification of the circuit of FIG. 15, in which transmission lines A and B are connected to a receiver circuit of the same type as shown in FIG. 2, through an emitter follower circuit for lowering the impedance, to thereby enable normal transmission even when one of the transmission lines is open. In FIG. 17, a transistor Tr3 has a base thereof connected to one input terminal of the receiver circuit, a collector thereof connected to the power supply Vcc, and an emitter thereof connected the earth potential via a resistor R52. The emitter of the transistor Tr3 is also connected to one input terminal (−) of the comparator C through the capacitor C1. A transistor Tr4 has a base thereof connected to the other input terminal of the receiver circuit, an emitter thereof connected to the power supply Vcc through a resistor R51, and a collector thereof grounded. The emitter of the transistor Tr4 is also connected to the other input terminal (+) of the comparator C through the capacitor C2.

During normal operation, the emitter follower circuit passes therethrough transmission signals without changing their waveforms, and accordingly the receiver circuit operates normally. If the transmission line A is opened at the position corresponding to the symbol "S", the transistor Tr4 is turned off. However, the impedance of the connection points L and M lowered by the resistors R51 and R52, and hence, the receiver operates in the same manner thereafter as in the case where one of the transmission lines is short-circuited to the earth potential, thus enabling signal reception. Meanwhile, resistors may not necessarily be used as the elements R51 and R52; for example, constant current supplies or the like may be connected instead.

As described above, the impedance altering means is arranged before (at the input side of) the receiver circuit including the capacitor which serves to cut off a direct-current component to enable signal reception even when one of the transmission lines is short-circuited to the earth potential. By thus using the impedance altering means to lower the impedance, it is possible to obtain a receiver circuit which is capable of signal reception even when one of the transmission lines is opened.

Next, a transmitter/receiver circuit according to a fourth embodiment of the present invention will be described with reference to FIG. 18. This transmitter/receiver circuit is intended to ensure normal signal transmission even in the event of occurrence of various troubles, for example, even when the voltage of one of the transmission lines is fixed to a constant potential, a short circuit occurs between the two transmission lines, one of the transmission lines is disconnected. The transmitter/receiver circuit comprises a transmitter circuit similar to that of FIG. 11, an emitter follower circuit biased as in the case of FIG. 11 and including transistors Tr3 and Tr4 like the arrangement of FIG. 17, and a receiver circuit having an arrangement fundamentally identical to that of FIG. 2. The receiver circuit includes AC coupling capacitors C1 and C2, and a non-linear circuit N for voltage limitation, and is adapted to enable signal reception even when one of the transmission lines is short-circuited to a constant voltage. If a difference of ground potential exists between the transmitting and receiving nodes, the ground potential of the receiver circuit lowers and thus the potential at one end of the resistor R7 remote from the transistor Tr12 becomes higher than the power supply voltage, thus producing the possibility of the emitter follow circuit being operated improperly. To eliminate the awkward situation, diodes for producing a voltage drop are inserted before the emitter follower circuit. Reference symbols J1 and J2 denote constant current circuits.

Figure 18:
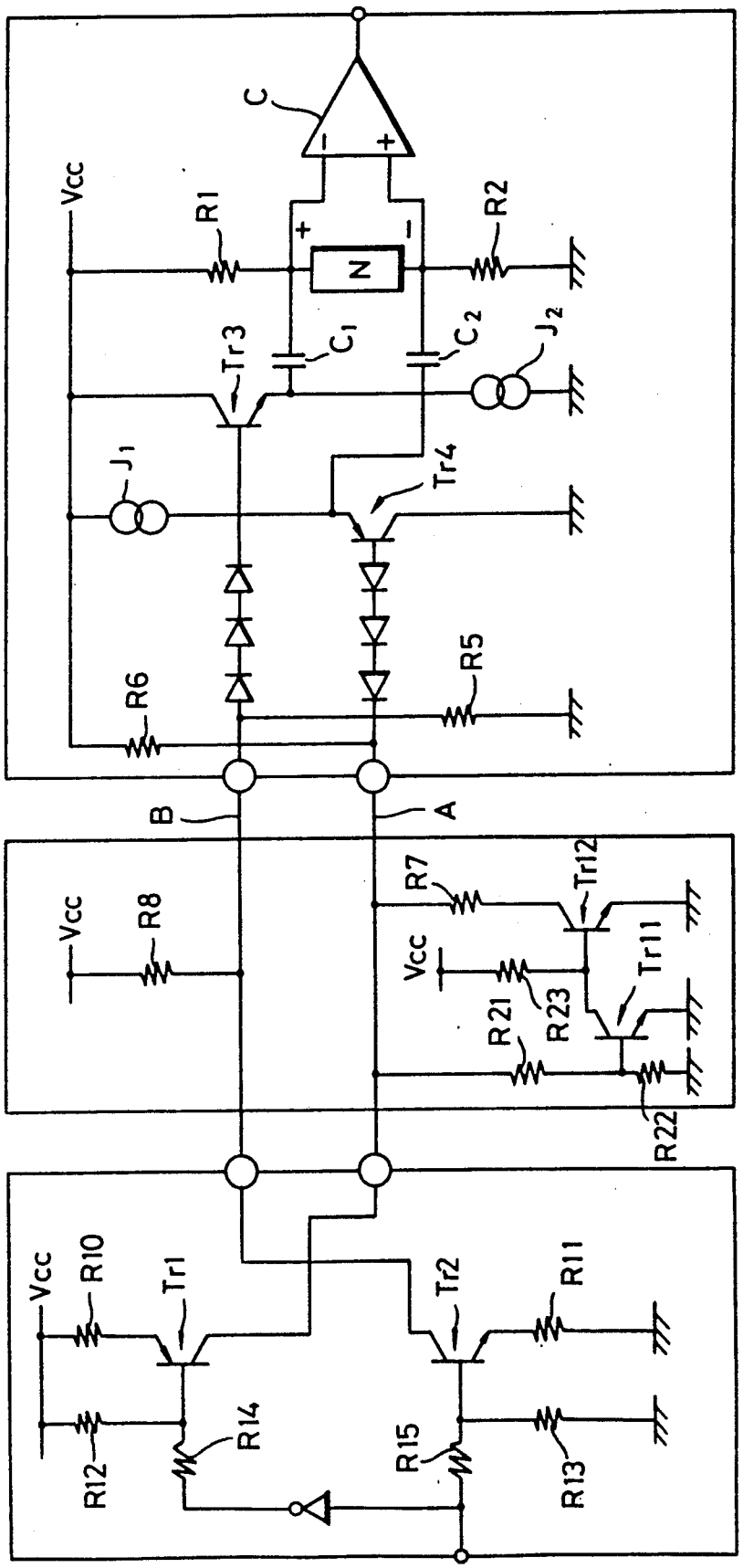
FIG. 18 is a circuit diagram illustrating a transmitter/receiver circuit according to a fourth embodiment of the present invention.

The emitter follower circuit of FIG. 18 operates similarly to the aforementioned abnormal voltage detection circuit G and switch circuit I, to enable signal transmission in the event of short-circuiting between the transmission lines. For example, when the voltage at the one terminal of the resistor R7 rises, the transistor Tr4 is turned off, whereby the collector voltage of the transistor Tr4 is fixed at the power supply voltage by the constant current circuit J1. Even if one of the transmission lines is opened to cause a high-impedance state of the corresponding input terminal, for example, if the transmission line A is disconnected, the input voltage is increased through the resistor R6 and thus signal transmission is possible. If a plurality of receiver circuits, transmitter circuits, and bias circuits according to the present invention are arranged in parallel in the transmission lines, they can be operated without any inconveniences.

What is claimed is:

1. A communication system including a pair of first transmission lines as a balanced transmission line, and at least one transmitter circuit and at least one AC coupling receiver circuit both connected to the first transmission lines, said AC coupling receiver circuit comprising:

AC coupling capacitors connected at respective input sides of the AC coupling capacitors to said pair of first transmission lines, respectively;

a pair of second transmission lines connected respectively to output sides of said AC coupling capacitors;

voltage comparator means connected to said pair of second transmission lines, so as to be thereby connected to the output sides of said AC coupling capacitors via said pair of second transmission lines;

a non-linear element having opposite ends connected directly to respective ones of said pair of second transmission lines at locations between said voltage comparator means and said AC coupling capacitors, said non-linear element including means for causing said pair of second transmission lines to be substantially conductive to one another when a voltage applied across said non-linear element is higher than a predetermined voltage;

means for biasing said pair of first transmission lines at predetermined bias conditions with respect to ground potential;

short-circuit detection means for detecting a short circuit occurring between said pair of first transmission lines;

said biasing means including a bias altering circuit for changing a bias condition of one of said pair of first transmission lines when said short-circuit detection means detects a short circuit; and input potential fixing means for fixing the voltage of a first transmission line-side portion of the AC coupling capacitor connected to the first transmission line whose bias condition is changed, at a predetermined potential with respect to said ground potential when said short-circuit detection means detects said, short circuit.

2. The communication system according to claim 1, wherein said non-linear element comprises at least one diode.

3. The communication system according to claim 1, wherein said non-linear element comprises at least one Zener diode.

4. A communication system including a pair of first transmission lines as a balanced transmission line, and at least one transmitter circuit and at least one AC coupling receiver circuit both connected to the first transmission lines, said AC coupling receiver circuit comprising:

AC coupling capacitors connected at respective input sides of the AC coupling capacitors to said pair of first transmission lines, respectively;

a pair of second transmission lines connected respectively to output sides of said AC coupling capacitors;

voltage comparator means connected to said pair of second transmission lines, so as to be thereby connected to the output sides of said AC coupling capacitors via said pair of second transmission lines;

a non-linear element having opposite ends connected directly to respective ones of said pair of second transmision lines at locations between said voltage comparator means and said AC coupling capacitors, said non-linear element including means for causing said pair of second transmission lines to be substantially conductive to one another when a voltage applied across said non-linear element is higher than a predetermined voltage; and impedance altering means arranged at input sides of said AC coupling capacitors, respectively, for selectively altering impedances of the first transmission lines at the input sides of said AC coupling capacitors; and said impedance altering means including means responsive to one of said pair of first transmission lines being opened, for bringing the impedance of the open first transmission line at the input side of the corresponding AC coupling capacitor, to a low impedance state.

5. The communication system according to claim 4, wherein said impedance altering means comprises a switch circuit.

6. The communication system according to claim 4, wherein said impedance altering means comprises a series circuit including a switch circuit and a second capacitor.

7. The communication system according to claim 4, wherein said impedance altering means comprises an emitter follower circuit having a base side coupled to an associated one of said pair of first transmission lines.

8. The communication system according to claim 4, further comprising an element coupled between the base side of said emitter follower circuit and the associated first transmission line, for causing a voltage drop across said element.

9. The communication system according to claim 4, wherein said non-linear element comprises at least one diode.

10. The communication system according to claim 4, wherein said non-linear element comprises at least one Zener diode.

* * * * *